United States Patent
Leonardi

(10) Patent No.: US 11,232,625 B2
(45) Date of Patent: Jan. 25, 2022

(54) IMAGE PROCESSING

(71) Applicant: Sony Interactive Entertainment Inc., Tokyo (JP)

(72) Inventor: Rosario Leonardi, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/910,822

(22) Filed: Jun. 24, 2020

(65) Prior Publication Data
US 2021/0012554 A1    Jan. 14, 2021

(30) Foreign Application Priority Data

Jul. 12, 2019 (GB) .................................. 1910034

(51) Int. Cl.
*G06T 9/00* (2006.01)
*G06T 15/08* (2011.01)

(52) U.S. Cl.
CPC ................ *G06T 15/08* (2013.01); *G06T 9/00* (2013.01)

(58) Field of Classification Search
CPC .................................. G06T 15/08; G06T 9/00
See application file for complete search history.

(56) References Cited

U.S. PATENT DOCUMENTS

| 2014/0232717 A1* | 8/2014 | Schpok | G09G 5/377 345/420 |
|---|---|---|---|
| 2017/0015057 A1* | 1/2017 | Stevens | B29C 64/386 |
| 2017/0147624 A1* | 5/2017 | Burger | H03M 7/6023 |
| 2018/0357814 A1* | 12/2018 | Bohn | G06T 15/005 |
| 2019/0156206 A1* | 5/2019 | Graham | G06N 3/0454 |
| 2019/0163958 A1* | 5/2019 | Li | G06K 9/0063 |

FOREIGN PATENT DOCUMENTS

| EP | 3413269 A1 | 12/2018 |
| WO | 2019158821 A1 | 8/2019 |

OTHER PUBLICATIONS

Klingensmith et al., CHISEL: Real Time Large Scale 3D Reconstruction OnBoard a Mobile Device, Conference Paper, Proceedings of Robotics Science and Systems 2015, Jul. 2015, total 11 pages including cover page. (Year: 2015).*

Jones, Distance Field Compression, Journal of WSCG, vol. 11, No. 1., ISSN 1213-6972, WSCG'2003, Feb. 3-7, 2003, 6 pages. (Year: 2003).*

Combined Search and Examination Report for corresponding GB Application No. 1910034.6, 7 pages, dated Nov. 28, 2019.

(Continued)

*Primary Examiner* — Yanna Wu
(74) *Attorney, Agent, or Firm* — Matthew B. Dernier, Esq.

(57) ABSTRACT

An image processing method includes generating an initial representation of a three-dimensional environment using a three-dimensional array of elements having a first spatial resolution with respect to the three-dimensional environment; generating a distance field, DF, representation from the initial representation, the DF representation including a three-dimensional array of distance values having a second spatial resolution with respect to the three-dimensional environment; and applying a data compression process to the DF representation to generate a data-compressed DF representation.

14 Claims, 10 Drawing Sheets

(56) References Cited

OTHER PUBLICATIONS

Y. Furukawa, et al., Multi-View Stereo: A Tutorial. Foundations and Trends in Computer Graphics and Vision, vol. 9, No. 1-2, pp. 1-148, (http://carlos-hernandez.org/papers/fnt_mvs_2015.pdf) Jan. 2013.

The Little Grasshopper: "Distance Fields" (https://prideout.net/blog/distance_fields/), 11 pages, Jan. 2012.

Chris Green, "Improved Alpha-Tested Magnification for Vector Textures and Special Effects" Green—Valve Corporation https://steamcdn-a.akamaihd.net/apps/valve/2007/SIGGRAPH2007_AlphaTestedMagnification.pdf, 5 pages, Jan. 2007.

Kenny Erleben, et al., "GPU Gems 3, chapter 34" (Erleben et al.) (https://developer.nvidia.com/gpugems/GPUGems3/gpugems3_ch34.html), GPU Gems 3, chapter 34, 21 pages, Jan. 2003.

Jiang et al., "Convolutional Neural Networks on Non-Uniform Geometrical Signals using Euclidean Spectral Transformation", https://arxiv.org/pdf/1901.02070.pdf, International Conference on Learning Representations, pp. 1-16, Jan. 2019.

W. Randolph Franklin, "PNPOLY—point inclusion in polygon test" URL: https://wrf.ecse.rpi.edu/Research/Short_Notes/pnpoly.html. 9 pages, Dec. 11, 2018.

Extended European Search Report for corresponding EP Application No. 20180190.9, 8 pages, dated Dec. 3, 2020.

Laney D et al., "Multiresolution distance volumes for progressive surface compression" 3D Data Processing Visualization and Transmission. Computer Society, 2002 Proceedings First International Symposium, 10 pages, Jun. 19, 2002.

Sung-Ho Lee, et al., "Adaptive Synthesis of Distance Fields" IEEE Transactions on Visualization and Computer Graphics, vol. 18, No. 7, pp. 1135-1145, Jul. 1, 2012.

Jones M. W., et al., "3D Distance Fields: a survey of techniques and applications" IEEE Transactions on Visualization and Computer Graphics, vol. 12, No. 4, pp. 581-599, Jul. 1, 2006.

* cited by examiner

IMAGE PROCESSING

BACKGROUND

Field

This disclosure relates to image processing.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also act as increasingly suitable devices for the provision of such content. In addition to this, advances in computing and graphics technology have contributed to the increase in suitable content that may be made available.

While video games may be provided that can offer such an experience, the approaches taken to provide viewer immersion in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content. Examples of such changes in viewpoints include a user moving their head in a VR system in order to look around an environment, or an input using a controller or the like in a two-dimensional display arrangement.

It is in view of the above considerations that so-called free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment. These viewpoints may be distributed about an environment in a discreet fashion, or the changing of viewpoints may be a result of a continuous motion within the environment, or content may incorporate elements of each of these.

A number of challenges exist when seeking to provide high-quality image or video content with a free viewpoint. A number of such problems derive from the limitations of the content capturing systems that are used; for example, it may be difficult to capture sufficient image information due to occlusions, image resolution, and camera calibration or the like. In addition to this, information that may be required to generate additional viewpoints (such as lighting information, depth information, and/or information about occluded objects) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided, as it may introduce an undesirable latency or require excessive computing power. It is therefore considered that alternative modifications to the free viewpoint content generating may be advantageous.

It is in the context of the above problems that the present disclosure arises.

SUMMARY

This disclosure provides an image processing method comprising:
  generating an initial representation of a three-dimensional environment using a three-dimensional array of elements having a first spatial resolution with respect to the three-dimensional environment;
  generating a distance field, DF, representation from the initial representation, the DF representation comprising a three-dimensional array of distance values having a second spatial resolution with respect to the three-dimensional environment; and
  applying a data compression process to the DF representation to generate a data-compressed DF representation.

This disclosure also provides an image processing method comprising:
  generating an initial representation of a three-dimensional environment using a three-dimensional array of elements having a first spatial resolution with respect to the three-dimensional environment; and
  generating a distance field, DF, representation from the initial representation, the DF representation comprising a three-dimensional array of distance values having a second spatial resolution with respect to the three-dimensional environment;
  in which the second spatial resolution is a lower resolution than the first spatial resolution.

This disclosure also provides an image processing method comprising:
  decompressing input data representing a data-compressed distance field, DF, representation of a three-dimensional environment; and
  rendering one or more images for display in dependence upon the decompressed DF representation.

This disclosure also provides image processing apparatus comprising:
  a processor configured to generate an initial representation of a three-dimensional environment using a three-dimensional array of elements having a first spatial resolution with respect to the three-dimensional environment;
  a distance field, DF, representation generator configured to generate an DF representation from the initial representation, the DF representation comprising a three-dimensional array of distance values having a second spatial resolution with respect to the three-dimensional environment; and
  a data compressor configured to apply a data compression process to the DF representation to generate a data-compressed DF representation.

This disclosure also provides image processing apparatus comprising:
  a processor configured to generate an initial representation of a three-dimensional environment using a three-dimensional array of elements having a first spatial resolution with respect to the three-dimensional environment;
  a distance field, DF, representation generator configured to generate an DF representation from the initial representation, the DF representation comprising a three-dimensional array of distance values having a second spatial resolution with respect to the three-dimensional environment;
  in which the second spatial resolution is a lower resolution than the first spatial resolution.

This disclosure also provides image processing apparatus comprising:
  a data decompressor configured to decompress input data representing a data-compressed distance field, DF, representation of a three-dimensional environment; and
  an image renderer configured to render one or more images for display in dependence upon the decompressed DF representation.

Further respective aspects and features of the disclosure are defined in the appended claims.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

A number of different approaches for implementing free viewpoint content are considered to be suitable, including photogrammetric, light field/multiscopic, and volumetric approaches. Of course, a number of other approaches (or combinations of the above) may be considered.

The first of these approaches comprises the manipulation of captured images in order to appear three-dimensional; this can add freedom to the viewpoint by enabling the user to peer 'around' an object in the image—this can often be rather limited in scope, but is suitable for a number of purposes. Reprojection of the captured image is often used in methods following this approach, enabling the simulation of the 'correct' view (that is, a view that appears to be from the correct position).

The second approach relies on the capturing of a number of images of the environment from different locations. A free viewpoint experience may then be provided to the user by using interpolation between the captured images; the user is able to manipulate the viewpoint freely within the bounds of the image capture area (that is, the area or volume bounded by the image capture devices).

The third approach that is considered, which is the approach in the context of which the present application is provided, comprises the generation of a virtual scene representing the imaged volume in the content capture process. This may include identifying the geometry of the volume and the objects within it, as well as determining any other parameters (such as lighting effects) as appropriate. Such an approach is discussed in 'Multi-View Stereo: A Tutorial' (Y Furukawa, C Hernández, Foundations and Trends in Computer Graphics and Vision, Vol 9, No. 1-2, 2013), the contents of which are incorporated by reference.

While the present application is framed within the context of the volumetric approach to free viewpoint content, it is considered that the techniques discussed within may be applicable to one or more other approaches.

Figure 1:
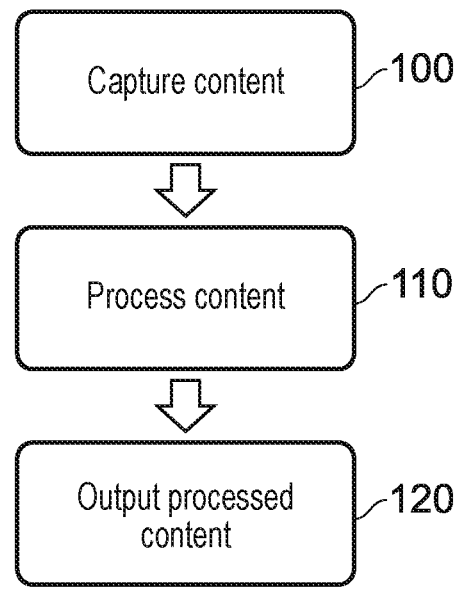
FIG. 1 schematically illustrates a free viewpoint generation and output method.

FIG. 1 schematically illustrates a method for capturing and generating free viewpoint content, in line with the third approach described above.

A step 100 comprises capturing the content. The content capturing process includes the use of image sensors, such as cameras, and may further include the use of microphones or the like for capturing audio. While in some cases the captured image content may be entirely two-dimensional, in other cases the content capturing process includes the capturing of depth information for a scene—this can be achieved using stereoscopic or depth cameras, for example, or any other method for determining the distance to an object in the capture environment. Examples of content capturing arrangements are described below with reference to FIGS. 2 and 3.

A step 110 comprises performing processing on the captured content, with the aim of generating content that a user is able to use to explore the captured environment with the aid of a free viewpoint. Examples of processing include the estimating of the depth of objects within the captured images, and the encoding of the processed data into a suitable format for storage and/or output to a viewer. Each of these is discussed below with reference to FIG. 5.

The processed data comprises a three-dimensional representation of the environment for which the content capture is performed (or is sufficiently complete so as to enable the generation of such a representation). This representation may be able to be distributed to a user to enable them to generate free viewpoint experiences locally, or it may be able to be used (for example, at a server) to generate image frames in accordance with a viewpoint defined by a client device.

A step 120 comprises the output of the free viewpoint content to a viewer. This may be performed in a number of different ways; for example, the viewer may request a particular viewpoint from a server which holds the encoded data. The server may then generate images representing the viewpoint at the requested position, and transmit this to the viewer. In some embodiments, the viewer may instead be provided with encoded data for the whole (or at least a part of) the captured environment such that processing for generating image content is performed locally.

Figure 2:
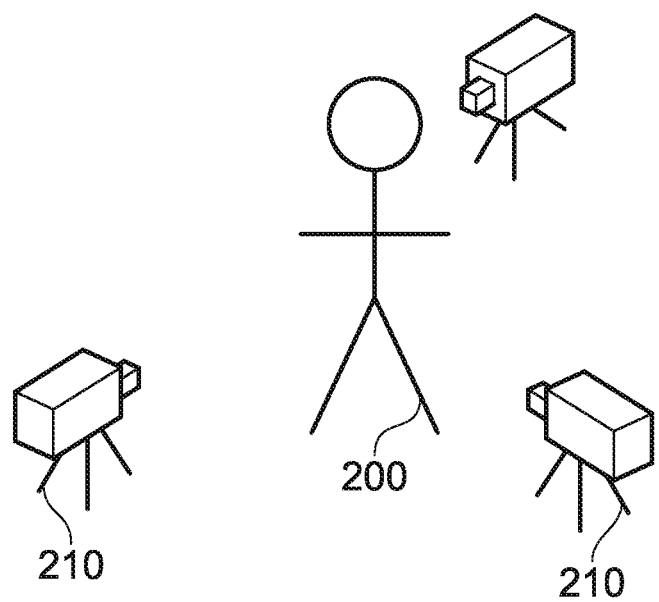
FIG. 2 schematically illustrates a content capture arrangement.

FIG. 2 schematically illustrates a content capture arrangement that may be used to implement step 100 as described with reference to FIG. 1.

In this Figure, a plurality of cameras 210 are arranged so as to capture images of a person 200 (such as an actor in a movie) from a range of different angles. The cameras 210 may also be configured to capture audio in the environment, although this may instead be captured separately. In some embodiments it is advantageous to be able to synchronise the cameras or establish the timing offset between their image capture—this may assist with generating a high-quality output for a user.

Between them, the cameras 210 may be arranged so as to be able to capture images of a significant proportion of the environment and objects within the environment. In an ideal scenario every part of every surface within the environment is imaged by the arrangement of cameras, although in practice this is rarely possible due to factors such as occlusions by other objects in the environment. Such an issue may be addressed in a number of manners, a selection of which is discussed below.

For example, the arrangement of cameras 210 as shown in FIG. 2 may be suitable for capturing images of the user from a number of angles—but the side of the person 200 facing away from the cameras may not be well-imaged, leading to a lack of information for this area. A number of techniques may be used to mitigate this problem, some of which will be discussed below.

Figure 3:
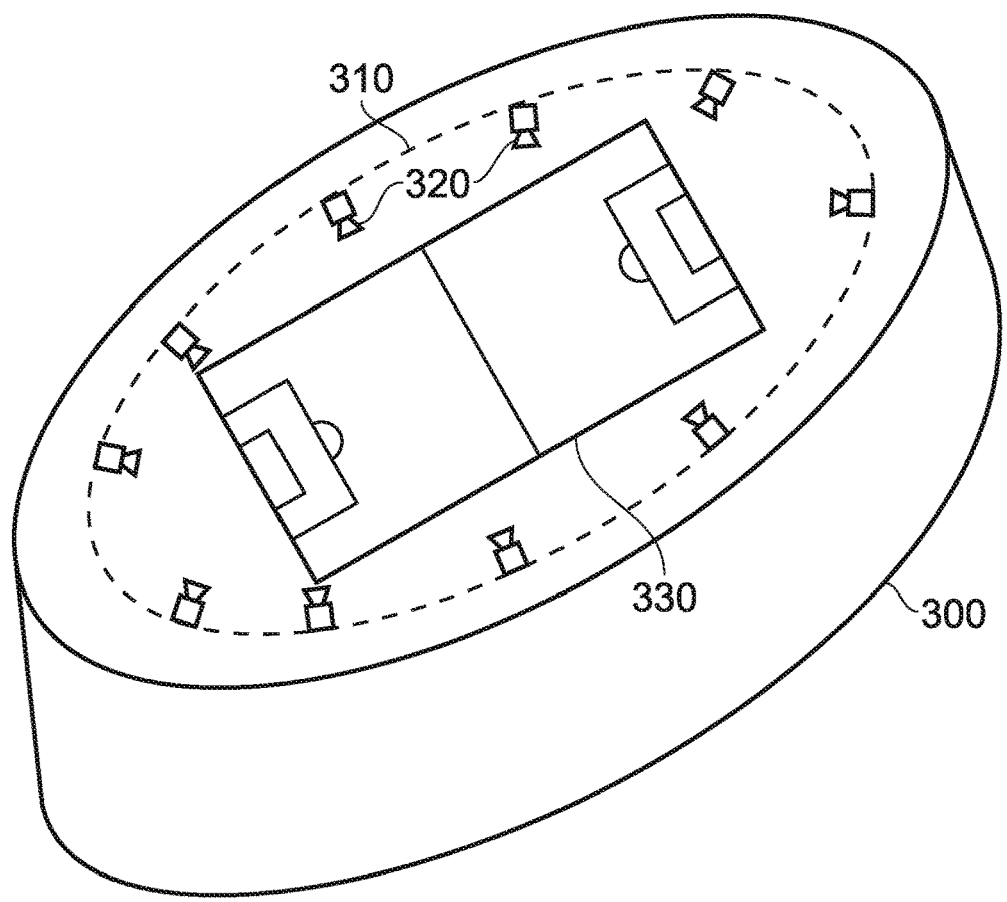
FIG. 3 schematically illustrates an alternative content capture arrangement.

FIG. 3 schematically illustrates an alternative content capture arrangement that may be used to implement step 100 as described with reference to FIG. 1. As is apparent from FIG. 3, this is a configuration that may be more suited for the capturing of large-scale events, such as sports matches, rather than individual people—although of course such an arrangement could be scaled down to an environment smaller than a sports stadium as appropriate.

FIG. 3 comprises a stadium 300 which has a fixture 310 that substantially follows the shape of the stadium 300. A plurality of cameras 320 are supplied on this fixture 310, and may be angled so as to capture images of events within the stadium 300; this may include the action on the pitch 330, the sidelines, or even the crowd. The number of cameras, and the properties of each camera, may be selected freely in order to provide a suitable degree of optical coverage of the environment. For example, a set of 40 cameras each with 4K resolution and arranged so as to be able to collectively image the whole pitch 330 may be provided.

Figure 4A:
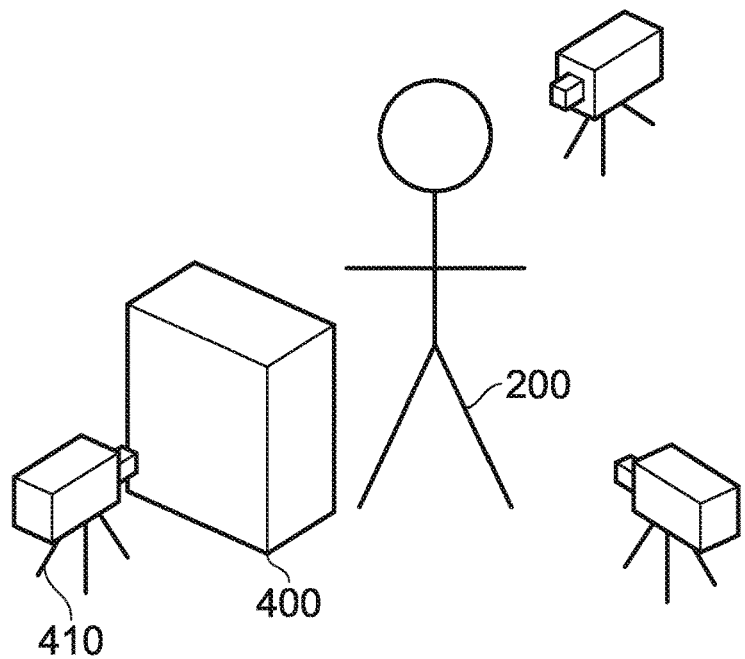
FIGS. 4a and 4b schematically illustrate an occluded content capture arrangement.
Figure 4B:
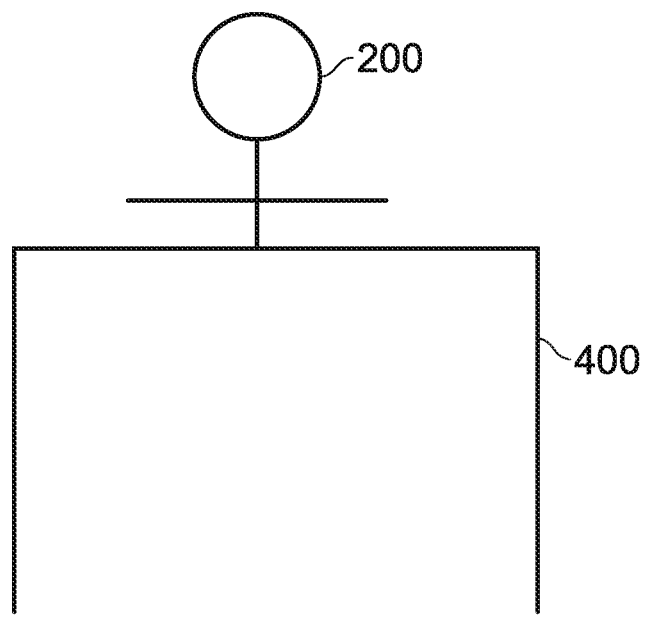

FIGS. 4a and 4b schematically illustrate an occlusion problem that may arise when capturing content in line with step 100 of FIG. 1.

FIG. 4a schematically illustrates an occluded content capture arrangement; this is the content capture arrangement of FIG. 2, with an additional object 400 in the capture environment that prevent the camera 410 from correctly imaging the person 200. Of course, while shown as an inanimate object the object 400 could be anything that blocks the camera's view—such as other people, cameras, or even inclement weather.

FIG. 4b schematically illustrates a viewpoint from the camera 410 of FIG. 4a. It is apparent from this Figure that the camera is no longer able to capture images of the lower half of the person's 200 body due to the occlusion by the object 400. This may lead to incomplete information about this area of the environment, which can cause problems in a free viewpoint arrangement—if a user moves the viewpoint to the other side of the object 400 there would not be sufficient information to generate a view of the person 200.

In some cases, the camera system for capturing images of the environment may be robust to such occlusions—for example, given enough cameras it is possible that the arrangement leads to every part of the environment (or at least a sufficient number of parts of the environment) being imaged by more than one camera. In such a case, it is possible that images of an area occluded from one camera's view are captured by another camera.

Alternatively, or in addition, a number of processing techniques may be used to fill such gaps. For instance, information about that area (such as the colour of the trousers worn by the person 200) may be stored from previously captured frames, or determined in dependence upon other information—for example, it may be assumed that the colour is constant (either over time, spatially, or both), and so any image of the trousers may be enough to supply the colour information despite being captured at a different time, and/or imaging a different portion of the trousers. Similarly, the colour could be input by an operator or the like.

Figure 5:
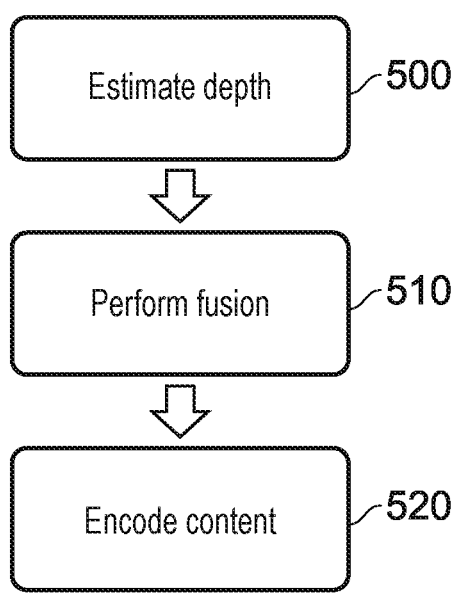
FIG. 5 schematically illustrates a content processing method.

FIG. 5 schematically illustrates a content processing method, which may be implemented as an example of the processing performed in step 110 of FIG. 1. Of course, any suitable processing may be performed in the step 110; it is not limited to that shown in FIG. 5, nor must every step of FIG. 5 be performed.

A step 500 comprises an estimation of the depth of one or more parts of the environment that is imaged. In some cases, this may be performed by identifying the disparity associated with an object between a pair of stereoscopic images; in other cases, monoscopic depth detection may be performed, or a position may be estimated from a number of images based upon knowledge about the position and orientation of the cameras used to capture those images.

A step 510 comprises the fusion of image data. Fusion of image data is the process of combining the information that is obtainable from each of a plurality of images in order to generate a three-dimensional space using images in a two-dimensional space. For example, image data may be fused so as to generate a three-dimensional model of an object that comprises two-dimensional information about each side of the object, as imaged by a corresponding plurality of cameras. This is discussed below in more detail, with reference to FIGS. 6 and 7.

A step 520 comprises the encoding of the processed image data, for example to generate data that is in a format that is suitable for storage and/or transmission to a user. Examples of suitable representations of the content include the use of point clouds and/or meshes to represent objects and features in the environment. For instance, a point cloud may be defined that describes the location of points on the surface of each of a number of objects/environmental features. When rendering an image, a viewpoint within the virtual environment may be defined and the point cloud is consulted to determine which objects (points) fall within the viewing frustum—once this is determined, corresponding texture information may be applied to generate a view within the virtual environment.

Further processing may also be performed in addition to, or instead of, one or more of the steps shown in FIG. 5. For example, segmentation may be performed so as to determine which elements of a captured image correspond to distinct objects and which elements form the background. Hole-filling or completion processing may also be performed, which is processing that seeks to identify where information about the environment is missing and to approximate information that may be desired, but is not present in the captured information.

As discussed with reference to step 510, fusion of image data may be performed in order to generate a more complete description of the environment in which image capture is performed. For example, image data from a second camera may be used to supplement the image data from a first camera, which can mitigate the problem of occlusion.

In general, fusion techniques utilise a number of captured images that each capture an image (a two-dimensional image and depth information) of the environment, the images being captured at different times or from different camera positions. These images are then processed to extract information to enable a three-dimensional reconstruction. An example of such a process is discussed below.

At a first stage, segmentation is performed. This process results in a separation of an imaged object and a background of the image from one another, such that the background may be removed from the image. The segmented image of the object, in conjunction with the depth data that is captured, can then be used to generate a three-dimensional image of the object from one side, where every pixel of the image represents a point in three-dimensional space.

By generating multiple such images from a number of viewpoints, three-dimensional images may be generated for an object from a number of different sides; this can enable the construction of a full three-dimensional volume representing the external shape of the object. The fusion process here is used to correlate matching points as captured by the different cameras, and to remove any erroneous points, so as to enable a combination of the captured three-dimensional images into a three-dimensional representation.

Figure 6:
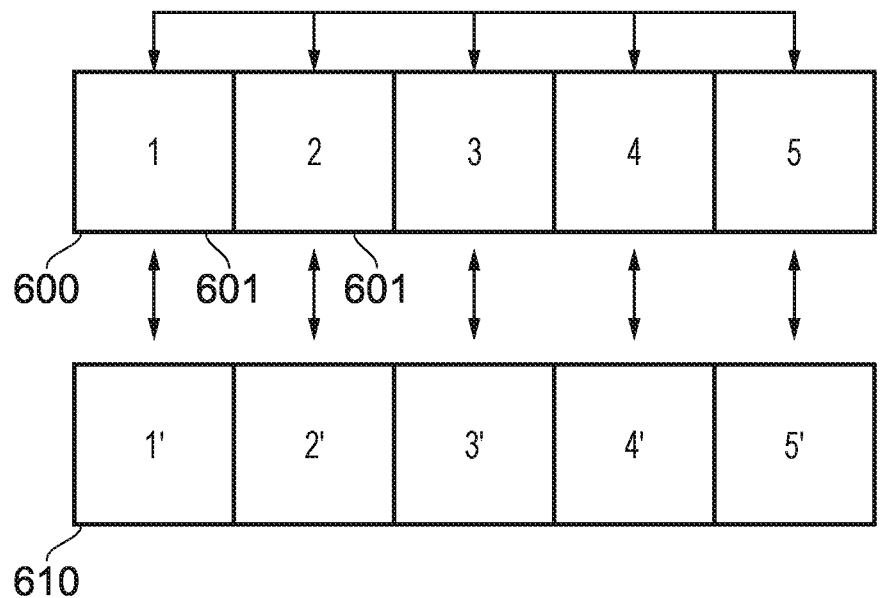
FIG. 6 schematically illustrates image fusion schemes.

FIG. 6 schematically illustrates examples of such fusion. A first image data set 600 and a second image data set 610 are shown, which correspond respectively to image data captured by a first and a second camera. Each of the image data sets comprises a number of consecutive frames 601.

Temporal fusion is a fusion technique that may be performed within a single image data set (that is, an image data set captured by a single camera over a time duration). In FIG. 6, this is shown with respect to the image data set 600, wherein information from the frames 601 (labelled 1-5) may each be used to supplement data from the other frames. Temporal fusion may be advantageous when there is motion of objects within the environment; occlusions may vary between the image frames captured by a single camera, and therefore image data from earlier- or later-captured frames may be suitable to fill gaps (such as those due to occlusion) in the data for a given image frame.

Spatial fusion may be performed between the two image data sets 601 and 610 (that is, image data sets captured by cameras located at different viewpoints); for example, image data from the frame labelled 1' may be used to supplement the image data derived from the frame labelled 1. This may be performed for any pairing of image frames, rather than necessarily being limited to those captured at (at least substantially) the same time. Spatial fusion is advantageous in that the image data from each of the image data sets is obtained from a different position—different views of the same object may therefore be captured.

Figure 7:
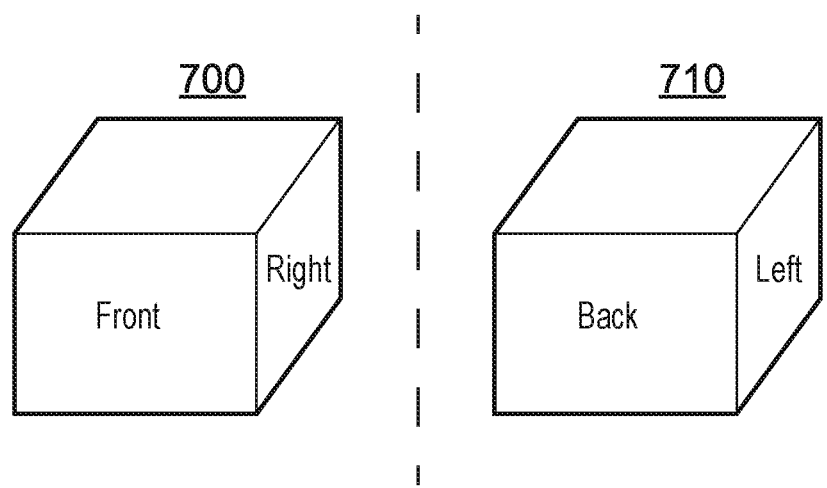
FIG. 7 schematically illustrates image frames for performing image fusion.

FIG. 7 schematically illustrates an example of two image frames 601, each imaging the same object. In the first, labelled 700, the front, top, and right portions of the object can be seen by an image capture device. In the context of FIG. 6, the image 700 may correspond to the image frame labelled 1 in the image data set 600.

In the second, labelled 710, the back, left, and top portions of the object can be seen by an image capture device. In the context of FIG. 6, the image 710 may correspond to the image frame labelled 1' in the image data set 610. This view would therefore represent a view of the object as captured by a different image capture device that is provided at a different location. Alternatively, the image 710 may correspond to the image frame labelled 5 in the image data set 600. This view would therefore represent a view of the object as captured by the same image capture device but at a later time, this time difference being sufficiently long that the object has rotated (or the camera has moved).

In either case, the data from each of the images 700 and 710 may be combined so as to generate a more complete description of the imaged object than would be available using only a single image frame comprising the object. Of course, any suitable combination of spatial and temporal fusion may be used as appropriate—the fusion process should not be limited to the specific examples provided above.

It should be appreciated that the segmentation-based approach used in the example above is non-limiting; other methods may be suitable. For example, a truncated signed distance function (TSDF) or other distance field (DF) representation such as those discussed below may be used to represent a scene volumetrically, with this representation being used for integrating multiple images of the scene captured from different viewpoints.

At the conclusion of the method described with reference to FIG. 5 (or an equivalent processing of the captured data), it is anticipated that the captured content has been converted into a form that enables the generation of a viewpoint at any (or at least at a substantial number of) locations within the captured environment.

Figure 8:
FIG. 8 schematically illustrates a data structure.

FIG. 8 schematically illustrates an exemplary data structure for the storage of the generated content; the stored generated content may be referred to as free viewpoint data. In this data format, a file 800 comprises point cloud information 810, texture information 820, and additional information 830. Of course, an alternative data structure may be provided, as is appropriate for the format of the generated content.

The point cloud information 810 may comprise sufficient data to enable to reproduction of the entire virtual environment, or at least a portion of that environment. For example, a different set of point cloud information 810 may instead be generated for each of a plurality of areas within the virtual environment—such as on a per-room basis.

The texture information 820 complements the point cloud information 810, such that textures are provided that correspond to each of the surfaces that are able to be described using the point cloud information 810. As noted above, the texture information is applied to the geometry described by the point cloud within a viewing region (defined by the viewpoint within the virtual environment) as a part of the rendering process. The textures can be stored in any suitable image format, for example.

The additional information 830 may comprise identifying information for the data structure (such as identifying the virtual environment that is represented by the included data). Alternatively, or in addition, information assisting with the reproduction of a virtual viewpoint within the virtual environment described by the point cloud information 810 may be provided; examples include lighting information for the environment. Any other suitable information may also be included as appropriate, such as object identification information or sound source information for the virtual environment.

As noted above, this information may be provided to the user in a raw form including data (such as a point cloud representation of the environment, in addition to texture and lighting information) for the whole of the environment. However, this represents a significant amount of data to transmit and store (point clouds may comprise millions or even billions of data points) and may therefore be inappropriate in a number of scenarios.

As an alternative, this information may be provided to a viewer by generating an image at a server in response to an input viewpoint position/orientation. While this may introduce an increased degree of input latency, it may be responsive enough to provide a suitable free viewpoint experience to a user.

In either case, rendering of a viewpoint must be performed based upon the encoded data. For example, when using a point cloud representation to store information about the captured environment the rendering process comprises a surface reconstruction process as a part of generating an image for display. This is performed so as to enable to generation of surfaces from a set of discrete points in the point cloud.

Figure 9:
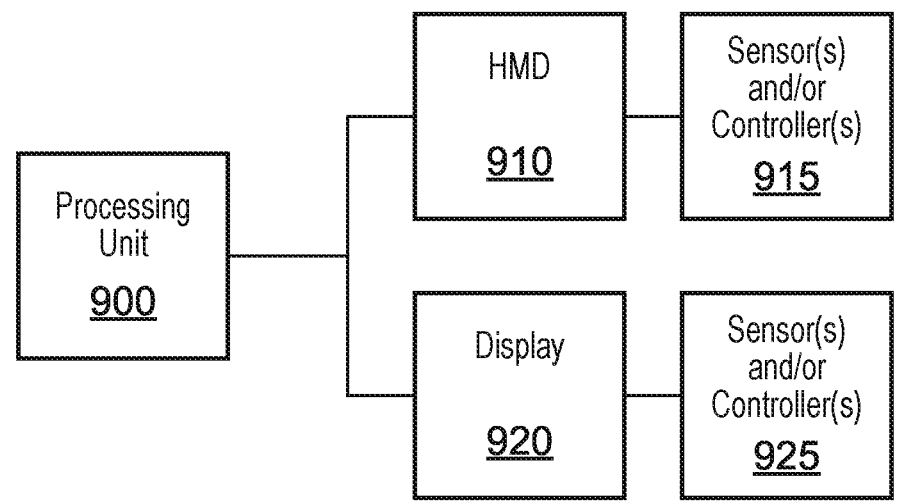
FIG. 9 schematically illustrates a content generation and display system.

FIG. 9 schematically illustrates a content generation and reproduction system. This system includes a processing unit 900, an HMD 910, and a display 920.

Figure 10:
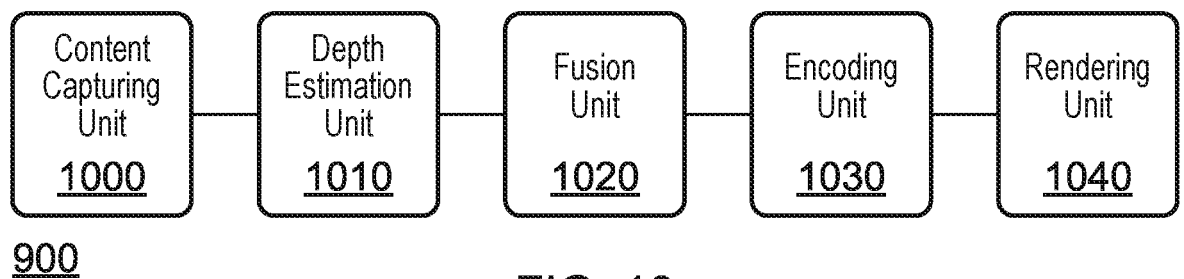
FIG. 10 schematically illustrates a processing unit.

The processing unit 900 is operable to generate content (for example, by using the method discussed with reference to FIG. 1), and to render a desired viewpoint for display to each of one or more users within the generated content. An exemplary arrangement of units within the processing unit 900 is shown in FIG. 10 and discussed below.

The desired viewpoint may be determined in any of a number of ways; for example, the HMD 910 may be associated with one or more position and/or orientation sensors 915 that enable the user's head motion (or any other suitable motion) to be used as an input to control the motion of the desired viewpoint. Alternatively, or in addition, the viewpoint may be controlled via inputs to a controller 915. Similarly, inputs to control the viewpoint may be provided via a control pad (such as a game controller) that is associated with one or more of the displays 910 (via the controller 915) and 920 (via the controller 925) and/or the processing unit 900.

In any case, the viewpoint may be controlled in a three-dimensional manner such that the user can move the viewpoint freely (or at least substantially freely) within the virtual environment, as well as modify the orientation of the viewpoint within the virtual environment defined by the free viewpoint data.

The HMD 910 and display 920 (such as a television, mobile phone or computer monitor) are operable to display content rendered by the processing unit 900. Each of these may be used independently, such that the other device does not display content at all, or in combination; for example, the displays may show the same content (with one of the display devices acting as a spectator screen, for example) or may show different viewpoints within the same virtual environment. Of course, the number of displays (head-mountable or otherwise) may be selected freely, rather than being limited to one of each type of display.

FIG. 10 schematically illustrates the processing unit 900, as described above with reference to FIG. 9. The processing unit 900 comprises a content capturing unit 1000, a depth estimation unit 1010, a fusion unit 1020, an encoding unit 1030, and a rendering unit 1040.

The content capturing unit 1000 is operable to control the content capture process; for example, this may comprise the control of one or more imaging units and/or audio capture units to generate information about a real environment. Such a process is described above with reference to step 100 of FIG. 1.

The depth estimation unit 1010 is operable to perform a process to generate estimates of the depth of one or more parts of the environment of which images are captured. This may comprise the use of any suitable depth estimation technique, and may use information about the locations of the content capturing devices. For example, this may comprise identifying the disparity between stereoscopic image pairs for an imaged feature. A depth estimation process is described above with reference to step 500 of FIG. 5.

The fusion unit 1020 is operable to perform an image fusion process so as to enable the generation of a coherent virtual representation of the real environment. This may include the generation of three-dimensional representations of imaged objects/features within the real environment. A fusion process is described above with reference to step 510 of FIG. 5.

The encoding unit 1030 is operable to generate data that is in a format that is suitable for the generation of images for display to a user, where those images may be generated for any viewpoint within the virtual environment. In some embodiments, the selected encoding method may be selected in dependence upon the desired transmission/storage methods. For example, if the encoded content is to be transmitted (such as to a separate rendering device via a network) the encoding method may be selected so as to either increase compression or reduce individual file size (such that files can be sent on an as-required basis). A content encoding process is described above with reference to step 520 of FIG. 5.

The rendering unit 1040 is operable to render images of the virtual environment for output to one or more displays (such as the HMD 910 and/or display 920 of FIG. 9). For example, the rendering process may comprise receiving a desired viewpoint (which may be determined based upon user inputs), identifying the regions of the point cloud that appear within the frustum defined by the desired viewpoint, and applying the corresponding textures to those point cloud regions.

In some embodiments, the processing unit 900 is instead not operable to generate the content, but is operable only to reproduce the content for display. For example, the content may be generated elsewhere and information (such as in the form of a file as discussed with reference to FIG. 8) may be provided to the processing unit 900 to enable a desired viewpoint to be rendered upon request for output to one or more display devices 910 and 920.

Of course, in some embodiments it is envisaged that the processing unit 900 may simply act as an intermediate device for accessing content from a server and providing it to the one or more displays 910 and 920. For example, rendered content could be provided to the processing device 900 by a server in response to uploaded information about a requested viewpoint; such content may then be transmitted to one or more displays 910 and 920.

Similarly, the processing unit 900 may be omitted altogether in embodiments in which the HMD 910 and/or display 920 are able to communicate with the server directly.

Figure 11:
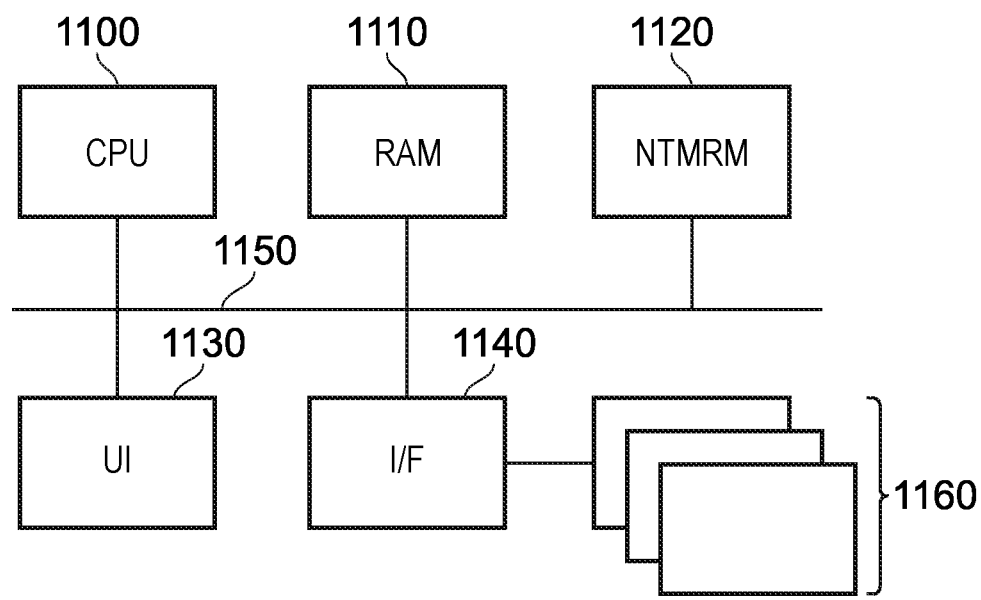
FIG. 11 schematically illustrates a data processing apparatus.

FIG. 11 schematically illustrates a data processing apparatus suitable to carry out the methods discussed above and in particular to implement one or both of the free viewpoint data generation technique(s) and the image viewing or presentation technique(s) outlined above, comprising a central processing unit or CPU 1100, a random access memory (RAM) 1110, a non-transitory machine-readable memory or medium (NTMRM) 1120 such as a flash memory, a hard disc drive or the like, a user interface such as a display, keyboard, mouse, or the like 1130, and an input/output interface 1140 linked to peripherals 1160 such as a camera, a display and a position and/or orientation and/or motion detector by which a current viewpoint (in a display mode) may be controlled. These components are linked together by a bus structure 1150. The CPU 1100 can perform any of the above methods under the control of program instructions stored in the RAM 1110 and/or the NTMRM 1120. The NTMRM 1120 therefore provides an example of a non-transitory machine-readable medium which stores computer software by which the CPU 1100 performs the method or methods discussed above.

Example techniques to be described below, for generating and using free viewpoint data as discussed above, to be described below can operate with respect to point cloud representations or voxel representations of the three-dimensional space. In this context, a voxel is a three-dimensional element of volume, similar in many respects to a pixel but in three dimensions and representing the finest distinguishable element of an object representable in three-dimensional space. The voxel can have various properties associated with it, for example density, opacity, colour and volumetric flow rate, allowing for display in a three dimensional virtual environment. Generally speaking, voxels are associated with locations in a three-dimensional space rather than intrinsically containing information about their location in three-dimensional space, again in a similar way to the way in which a pixel is associated with a position but does not itself contain information defining that position.

In the discussion below, a "value" associated with a voxel may be a colour or opacity value, but the voxels can have other properties as mentioned above.

Figure 12A:
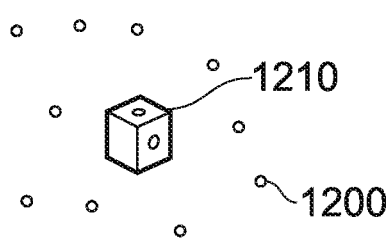
FIGS. 12a and 12b schematically represent the generation of a voxel representation from a point cloud representation.

In an example arrangement, if a point cloud representation has been generated, such as the point cloud 1200 of FIG. 12a, this can be sampled so as to generate a voxel representation, for example, by sampling the density of points of the point cloud within volumetric units 1210 each corresponding to a respective voxel.

For example, a number of points of the point cloud (which may of course be zero) lying within a volumetric unit 1210 can be counted and a density value assigned to the corresponding voxel in dependence upon the counted number of points. If the number of points within a unit 1210 is high, the display properties of the corresponding voxel (such as density or opacity) will be correspondingly dark.

Figure 12B:
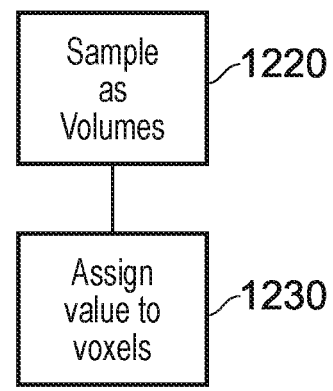

This process is summarised in FIG. 12b which is a schematic flowchart illustrating a method in which, at a step 1220, a point cloud representation is sampled as respective unit volumes, and at a step 1230, voxel values indicative of image content in that voxel are assigned to corresponding voxels.

The generation of voxels from the point cloud can lead to significant three-dimensional regions in which many or all voxels have zero opacity (that is to say, they represent empty space in the three-dimensional environment).

Figure 13A:
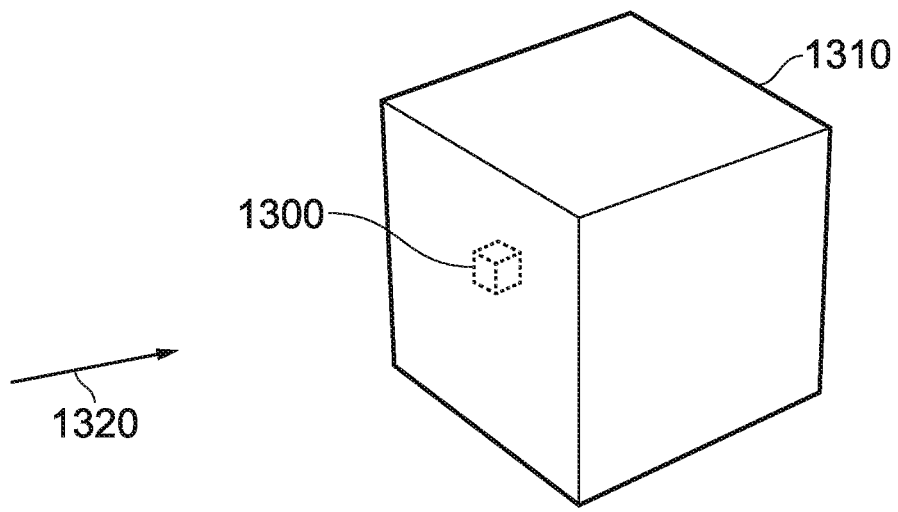
FIGS. 13a and 13b schematically represent the generation of a display image from a voxel representation.
Figure 13B:
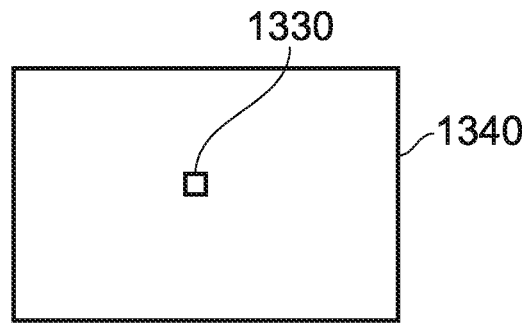

FIGS. 13a and 13b schematically represent an example voxel representation, in which an example voxel 1300 is displayed in the context of a three-dimensional array 1310 of voxels. For an arbitrary viewing direction 1320, the location in three-dimensional space of the voxel 1300 with reference to the viewing direction 1320, and the display properties including opacity associated with the voxel 1300 along with other voxels in front of and behind the voxel 1300, is used to render a view 1330 within a viewed image 1340 of the voxel 1300. A corresponding process is used in respect of other voxels as seen from the viewing direction 1320

So-called distance fields will now be discussed.

A distance field (DF) provides a representation of a sampling, on a three-dimensional grid basis, of the closest distance from a sample point to the nearest surface of an object in a three-dimensional representation of the object.

Some DF representations are "signed", and are referred to as signed distance fields, SDF. The term "signed" refers to a convention by which the SDF value associated with the point has a negative value when the point is inside an object and a positive value when the point is outside the object.

While DF representations are particularly suited to polygonal graphics representations, they can also be used with point cloud or voxel representations such as that generated using any of the techniques discussed above.

In the point cloud or voxel representations discussed above, objects can be defined by point cloud densities or voxel values of at least a threshold amount, so that volumes between objects are represented by zero or near-zero point cloud densities or zero or near-zero voxel density values, and the objects themselves are represented by point cloud densities or corresponding voxel density values of at least a threshold amount.

This implies that the edge of an object (relevant to the generation of the DF representation mentioned above) can be represented by a location in three-dimensional space at which either the point cloud density or the voxel value transitions from below the threshold value to above the threshold value.

Figure 14:
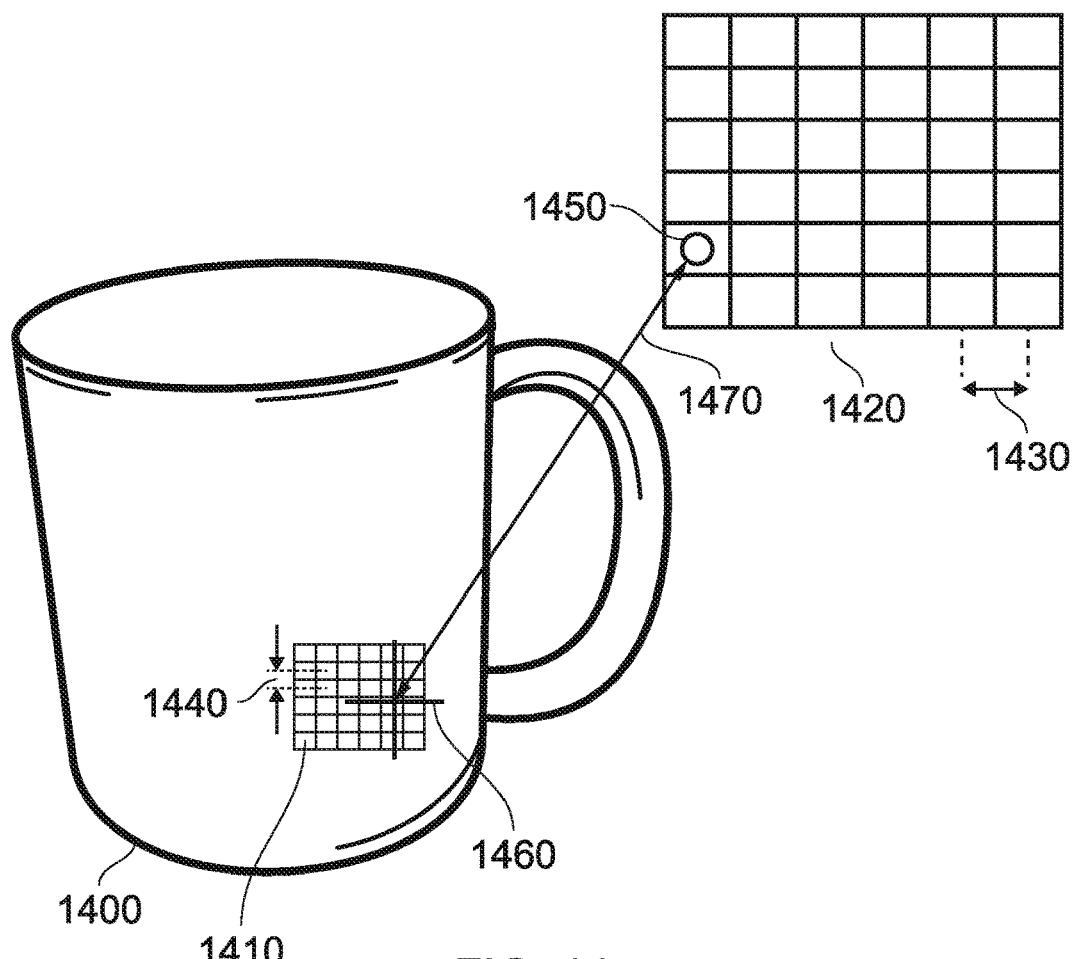
FIG. 14 schematically represents the generation of a signed distance field representation.

FIG. 14 schematically represents aspects of the generation of a DF representation from a voxel representation of an object 1400.

Here, the voxels 1410 forming the representation of the object 1400 have a particular voxel density, whereas the grid representation 1420 used in the DF has a different resolution (each grid point in the DF having at least a distance value associated with it). In some examples, the resolution of the grid representation 1420 can be such that the distance 1430 between adjacent points in the grid representation is greater than the distance 1440 between adjacent points in the voxel representation. In other words, this can be expressed as the DF grid representation 1420 having a lower resolution than the voxel representation. The generation of an DF representation having a lower grid resolution than the initial voxel representation provides for at least a degree of data compression in the present arrangements.

To generate the DF representation, a number of different techniques may be used. For example, in connection with a particular point 1450 in the grid representation, a scan can be conducted with respect to each voxel such as an example voxel indicated by grid lines 1460 to detect the distance 1470 from that arbitrary voxel to the point 1450. Amongst all voxels detected as representing edges (for example using the criteria discussed above) or in other examples amongst all voxels of at least a threshold density value, the closest one to the point 1450 is identified from this search and the corresponding distance 1470 to that nearest object point is provided as the DF distance value associated with the point 1450.

In an alternative but similar technique, the search can be conducted for each point on the object 1400 so that its respective distance to each point 1450 in the DF representation is detected, and from the collection of such distances, the DF representation can be populated.

Each distance value can also be associated with one or more display properties of the surface to which the distance relates, for example opacity, colour and the like.

Further aspects of DF and related techniques are disclosed by "Distance Fields" (Rideout) (https://prideout.net/blog/distance_fields/), "Improved Alpha-Tested Magnification for Vector Textures and Special Effects" (Green) (https://steamcdn-a.akamaihd.net/apps/valve/2007/SIGGRAPH2007_AlphaTestedMagnification.pdf), "GPU Gems 3, chapter 34" (Erleben et al) (https://developer.nvidia.com/gpugems/GPUGems3/gpugems3_ch34.html) and "Multi-view Stereo: a Tutorial" (Furukawa et al) (http://carlos-hernandez.org/papers/fnt_mvs_2015.pdf), the contents of all of which are incorporated herein by reference.

Independently of whether a lower resolution grid has been used, a data compression process can be applied to the DF data to allow for a lower data quantity for storage and/or transmission, with a corresponding data decompression process being applied before use (for example display in a free viewpoint system) of the DF information. In this context, data compression refers to techniques (having corresponding data decompression techniques) which reduce the quantity of data required to represent a data file or stream. Data compression techniques may be lossy (in which case the reconstructed data may not be exactly the same as the input data) or lossless (in which case an exact replica of the input data can be reconstructed at decompression). An example of a suitable data compression process is a Lempel-Ziv-Markov chain algorithm data compression process. This is an example of a data compression and decompression process in which a portion of data in an input data stream which is detected to be similar to or identical with a previously encoded portion is represented by a pointer or other reference to the previously encoded portion. At decoding, an output data stream is reconstructed by inserting referenced earlier portions into the data stream. An example of another type of data compression and decompression will be discussed below.

Note that the two techniques discussed above can be used independently or together. That is to say, (i) the SDF data can be generated at a lower spatial resolution than the initial representation (point cloud, voxel or the like); or (ii) the SDF data can be data compressed; or (iii) the SDF data can be generated at a lower spatial resolution than the initial representation and the SDF data can be data compressed.

The initial representation may be one of a point cloud representation and a voxel representation of the three-dimensional environment, but other representations could be used from which the SDF data is generated. An example of such a representation is a representation described in the paper "Convolutional Neural Networks on Non-Uniform Geometrical Signals using Euclidean Spectral Transformation", Jiang et al, ICLR 2019, https://arxiv.org/pdf/1901.02070.pdf, the contents of which are incorporated into this description by reference.

As discussed above, in some examples, the initial representation is a voxel representation; and generating the initial representation comprises capturing two or more images of the three-dimensional environment; generating a precursor point cloud representation from the captured images; and generating the voxel representation from the precursor point cloud representation. For example, generating the voxel representation from the precursor point cloud representation comprises detecting a point cloud density in each of a plurality of volume elements each corresponding to a voxel, and assigning display properties to the corresponding voxels in response to the detected point cloud densities.

The techniques may comprise storing and/or transmitting the data-compressed DF representation.

Figure 15:
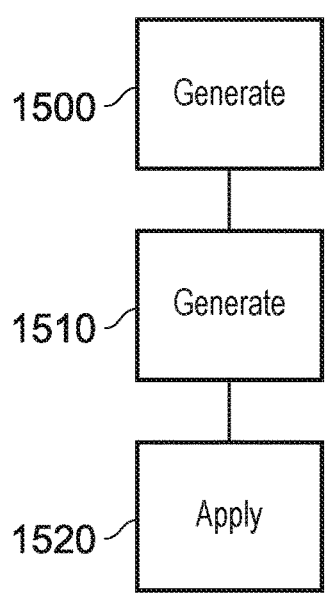
FIGS. 15 to 17 are schematic flowcharts representing respective methods.
Figure 16:
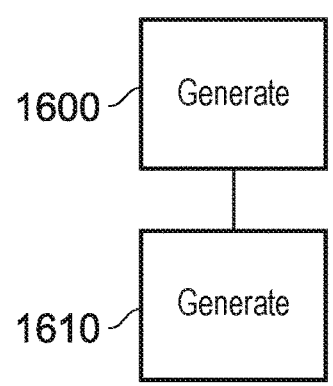
Figure 17:
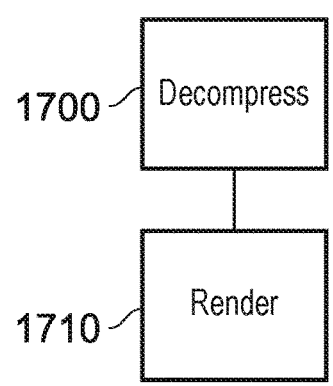

To summarise these example processes and techniques, FIGS. 15 to 17 provide schematic flowcharts representing respective example methods.

FIG. 15 schematically represents an image processing method comprising:

generating (at a step 1500) an initial representation of a three-dimensional environment using a three-dimensional array of elements having a first spatial resolution with respect to the three-dimensional environment;

generating (at a step 1510) a distance field, DF, representation from the initial representation, the DF representation comprising a three-dimensional array of distance values having a second spatial resolution with respect to the three-dimensional environment; and applying (at a step 1520) a data compression process to the DF representation to generate a data-compressed DF representation.

FIG. 16 schematically represents an image processing method comprising:

generating (at a step 1600) an initial representation of a three-dimensional environment using a three-dimensional array of elements having a first spatial resolution with respect to the three-dimensional environment; and generating (at a step 1610) a distance field, DF, representation from the initial representation, the DF representation comprising a three-dimensional array of distance values having a second spatial resolution with respect to the three-dimensional environment;

in which the second spatial resolution is a lower resolution than the first spatial resolution.

FIG. 17 schematically represents an image processing method comprising:

decompressing (at a step 1700) input data representing a data-compressed distance field, DF, representation of a three-dimensional environment; and rendering (at a step 1710) one or more images for display in dependence upon the decompressed DF representation.

Note that the method of FIG. 17 may be appended to the method of either of FIG. 15 or FIG. 16.

The one or more images may be displayed using a head-mountable display such as the display 920 discussed above.

In each case, embodiments of the disclosure are represented by computer software which, when executed by a computer, causes the computer to carry out the respective method and by a machine-readable non-transitory storage medium which stores such computer software. In the case of encoding methods, embodiments of the disclosure are represented by a data signal comprising coded data generated according to the respective method.

Figure 18:
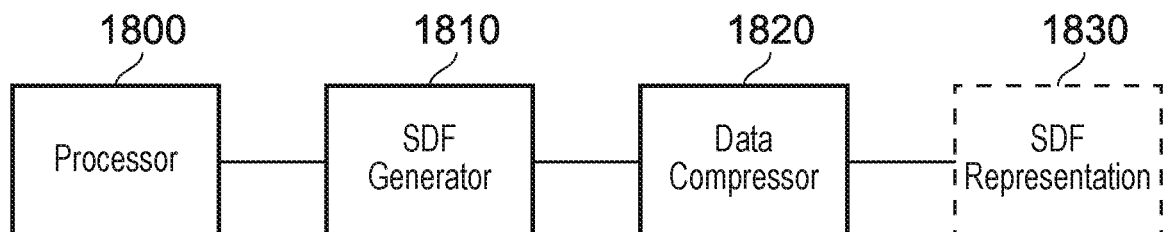
FIGS. 18 to 20 are schematic diagrams representing respective apparatus.
Figure 19:
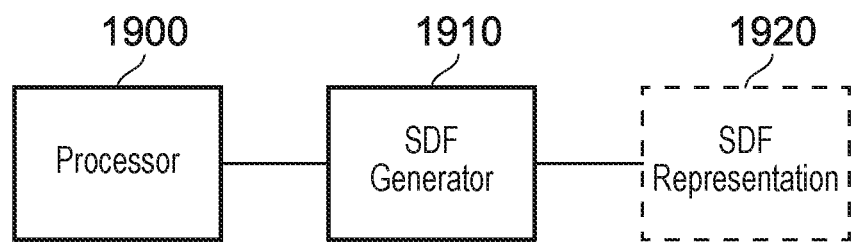
Figure 20:
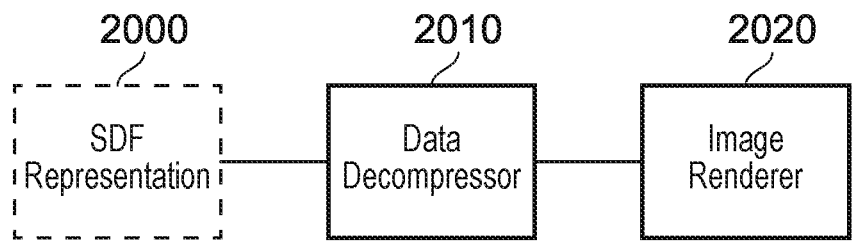

FIGS. 18 to 20 schematically illustrate respective example apparatus, which may be embodied by the apparatus of FIG. 11 discussed above.

FIG. 18 schematically illustrates image processing apparatus comprising:

a processor 1800 configured to generate an initial representation of a three-dimensional environment using a three-dimensional array of elements having a first spatial resolution with respect to the three-dimensional environment;

a distance field, DF, representation generator 1810 configured to generate an DF representation from the initial representation, the DF representation comprising a three-dimensional array of distance values having a second spatial resolution with respect to the three-dimensional environment; and a data compressor 1820 configured to apply a data compression process to the DF representation to generate a data-compressed DF representation 1830.

FIG. 19 schematically illustrates image processing apparatus comprising:

a processor 1900 configured to generate an initial representation of a three-dimensional environment using a three-dimensional array of elements having a first spatial resolution with respect to the three-dimensional environment;

a distance field, DF, representation generator 1910 configured to generate an DF representation 1920 from the initial representation, the DF representation comprising a three-dimensional array of distance values having a second spatial resolution with respect to the three-dimensional environment;

in which the second spatial resolution is a lower resolution than the first spatial resolution.

FIG. 20 schematically illustrates image processing apparatus comprising:

a data decompressor 2010 configured to decompress input data 2000 representing a data-compressed distance field, DF, representation of a three-dimensional environment; and an image renderer 2020 configured to render one or more images for display in dependence upon the decompressed DF representation.

Figure 21:
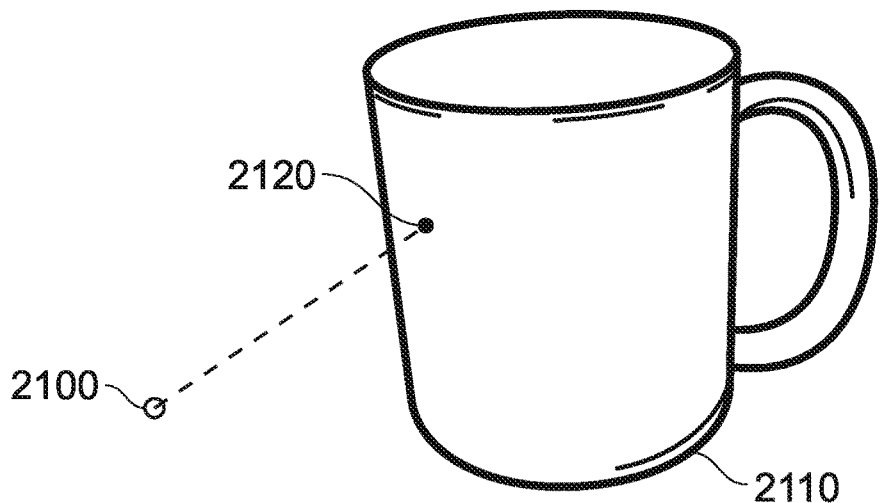
FIG. 21 schematically illustrates a detection technique.

FIG. 21 schematically illustrates options with respect to a test for determining whether an arbitrary point 2100 is within or outside a shape 2110 in three dimensions defined by the point cloud, voxel or other representations discussed above.

One test is a spherical angle test in which the following integral is derived for all points 2120 on the surface S 2110 with respect to the point under test 2100.

$$\text{solid angle} = \iint_S \sin\theta \, d\theta \, d\varphi$$

Here, $\theta$ is the colatitude (angle from the north pole) and $\varphi$ is the longitude.

This is similar to a three-dimensional version of the so-called winding number test applicable to two-dimensional forms.

If the result of the integral is a positive multiple of $4\pi$ then the point 2100 is inside the surface 2110. If the result of the integral is zero then the point 2100 is outside the surface 2110. This test can be applied to all points within the grid of distance values associated with the DF representation and the result associated with a sign value of, for example, +1 if the point 2100 is outside the shape including the nearest surface point and −1 if inside.

The result can also be rounded to the nearest (zero or more) multiple of $4\pi$, which caters for situations where the solid object is not fully closed, for example.

In this way, the DF representation may be a signed distance field, SDF, representation, having a sign associated with each distance value indicating whether the associated distance value represents a distance from an interior or exterior location with respect to a nearest surface, the distance to the nearest surface being defined by the distance value.

Another technique for detecting whether a point is inside a 3-dimensional shape is defined by PNPOLY-Point Inclusion in Polygon Test (Franklin), (https://wrf.ecse.rpi.edu//Research/Short_Notes/pnpoly.html#3D) the contents of which are incorporated in this description by reference.

Another technique is a ray casting technique, in which a notional ray is established form the point under test towards the nearest surface of a solid or hollow object. If it intersects surfaces an odd number of times, it can be assumed that the point is inside the object. If an even number of times then it can be assumed that the point is outside the object.

Figure 22:
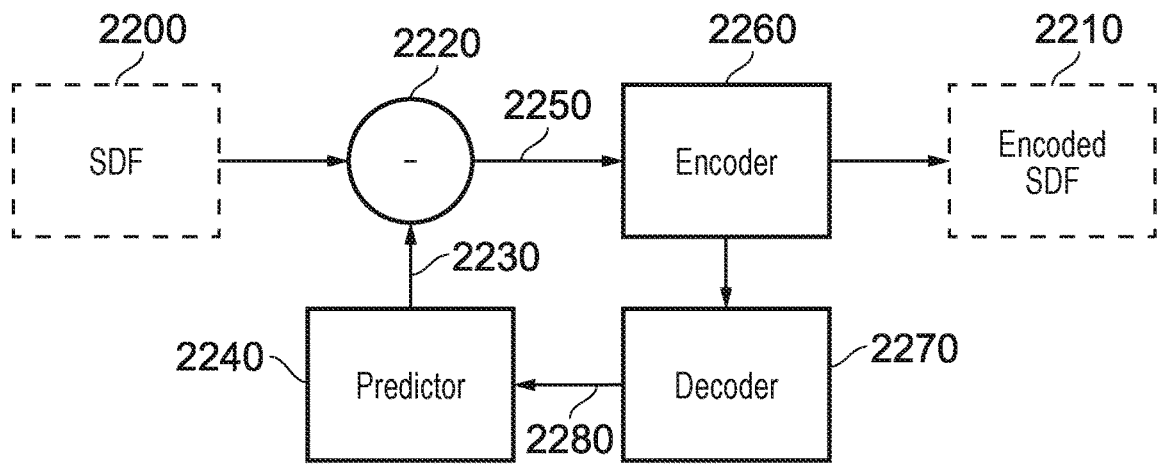
FIG. 22 schematically illustrates a data encoder.
Figure 23:
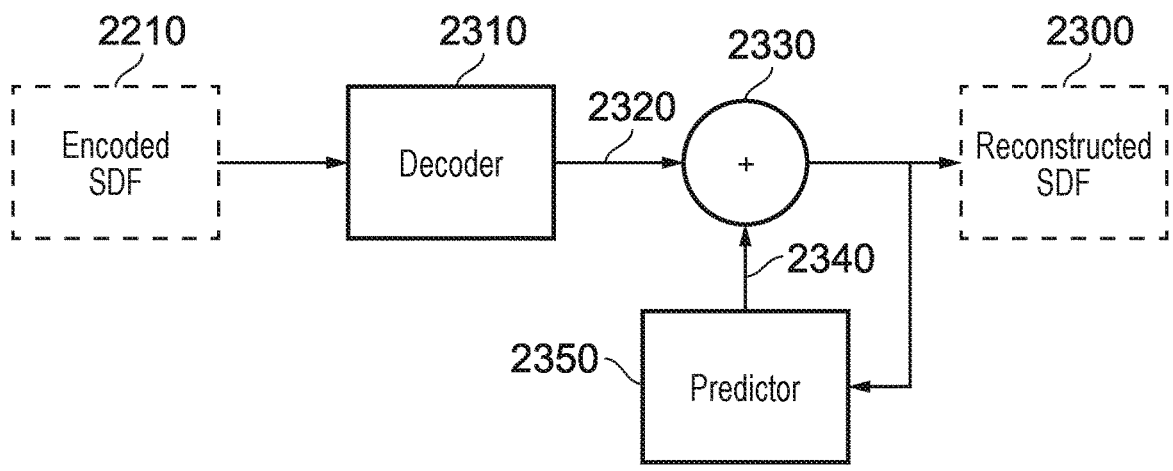
FIG. 23 schematically illustrates a data decoder.

FIG. 22 schematically represents a data compression arrangement and FIG. 23 a complementary data decompression arrangement.

In particular, FIG. 22 has as an input a distance field representation such as an SDF representation 2200 and generates an encoded SDF representation 2210 as an output. The decoding or decompression apparatus of FIG. 23 has the encoded SDF 2210 as an input and generates a reconstructed SDF 2300 as an output. The arrangement of FIGS. 22 and 23 can be lossy, in which case the reconstructed SDF 2300 is an approximation of the SDF data 2200 or lossless, in which the two are identical.

Referring to FIG. 22, the SDF representation is provided to a subtractor 2220 which establishes the difference between the input SDF representation and a predicted version 2230 generated by a predictor 2240. The difference or residual representation 2250 is provided to an encoder 2260 for encoding as the encoded SDF 2210. The encoded version is also provided to a decoder 2270 to generate a decoded version 2280 of the encoded SDF 2210 which is provided to the predictor 2240 for use in generating the prediction 2230.

To achieve lossy operation, the encoding process 2260 can make use of, for example, quantization or similar techniques.

By basing the encoding on residual data 2250 with respect to the prediction 2230, it is possible to achieve data compression by exploiting temporal similarities between the SDF data associated with successive video frame periods. The prediction process carried out by the predictor 2240 can also make use of spatial similarities, for example by basing the prediction 2230 for a particular region within the SDF representation upon SDF data associated with another region in the same video frame or a different video frame. In these respects, the operation of the apparatus of FIG. 22 has some similarities to conventional video encoding arrangements such as those defined by the MPEG standards.

In FIG. 23, the encoded SDF 2210 is provided to a decoder 2310 to generate a decoded output 2320 representing the residual or different signal, which is then added by an adder 2330 to a prediction 2340 generated by a predictor 2350 using techniques complementary to those of the predictor 2240 and based upon the reconstructed SDF 2300.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. An image processing method comprising:
generating an initial representation of a three-dimensional environment using a three-dimensional array of elements having a first spatial resolution with respect to the three-dimensional environment;
generating a distance field, DF, representation from the initial representation, the DF representation comprising a three-dimensional array of distance values having a second spatial resolution with respect to the three-dimensional environment; and
applying a data compression process to the DF representation to generate a data-compressed DF representation,
wherein the first spatial resolution is a measure of a distance between adjacent points in the three dimensional array of elements, and
wherein the second spatial resolution is a measure of a distance between adjacent points in the three-dimensional array of distance values.

2. The method of claim 1, in which the second spatial resolution is a lower resolution than the first spatial resolution.

3. The method of claim 1, in which the data compression process is a lossless data compression process.

4. The method of claim 3, in which the data compression process is a Lempel-Ziv-Markov chain algorithm data compression process.

5. The method of claim 1, in which the data compression process is a lossy data compression process.

6. The method of claim 1, in which the step of generating the initial representation comprises generating one of a point cloud representation and a voxel representation of the three-dimensional environment.

7. The method of claim 6, in which:
the initial representation is a voxel representation;
the step of generating the initial representation comprises capturing two or more images of the three-dimensional environment; generating a precursor point cloud representation from the captured images; and generating the voxel representation from the precursor point cloud representation.

8. The method of claim 7, in which the step of generating the voxel representation from the precursor point cloud representation comprises detecting a point cloud density in each of a plurality of volume elements each corresponding to a voxel, and assigning display properties to the corresponding voxels in response to the detected point cloud densities.

9. The method of claim 1, comprising storing and/or transmitting the data-compressed DF representation.

10. The method of claim 1, comprising:
decompressing the data-compressed DF representation; and
rendering one or more images for display in dependence upon the decompressed DF representation.

11. The method of claim 10, comprising displaying the one or more images using a head-mountable display.

12. The method of claim 1, in which the DF representation is a signed distance field, SDF, representation, having a sign associated with each distance value indicating whether the associated distance value represents a distance from an interior or an exterior location with respect to a nearest surface.

13. A non-transitory, machine readable storage medium which stores computer software which, when executed by a computer, causes the computer to perform a method for:
generating an initial representation of a three-dimensional environment using a three-dimensional array of elements having a first spatial resolution with respect to the three-dimensional environment;
generating a distance field, DF, representation from the initial representation, the DF representation comprising a three-dimensional array of distance values having a second spatial resolution with respect to the three-dimensional environment; and applying a data compression process to the DF representation to generate a data-compressed DF representation, wherein the first spatial resolution is a measure of a distance between adjacent points in the three dimensional array of elements, and wherein the second spatial resolution is a measure of a distance between adjacent points in the three-dimensional array of distance values.

14. Image processing apparatus comprising:

a processor configured to generate an initial representation of a three-dimensional environment using a three-dimensional array of elements having a first spatial resolution with respect to the three-dimensional environment;

a distance field, DF, representation generator configured to generate an DF representation from the initial representation, the DF representation comprising a three-dimensional array of distance values having a second spatial resolution with respect to the three-dimensional environment; and a data compressor configured to apply a data compression process to the DF representation to generate a data-compressed DF representation, wherein the first spatial resolution is a measure of a distance between adjacent points in the three dimensional array of elements, and wherein the second spatial resolution is a measure of a distance between adjacent points in the three-dimensional array of distance values.

* * * * *